(12) United States Patent
Seemann et al.

(10) Patent No.: US 10,406,639 B2
(45) Date of Patent: Sep. 10, 2019

(54) METHOD FOR REPAIRING TURBINE COMPONENTS

(71) Applicant: ANSALDO ENERGIA SWITZERLAND AG, Baden (CH)

(72) Inventors: Michael Seemann, Laufenburg (DE); Thomas Schnittger, Wettingen (CH); Marcel Timper, Baden (CH); Patrik Sondej, Windisch (CH); Frigyes Szuecs, Langenbruck (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 360 days.

(21) Appl. No.: 15/314,776

(22) PCT Filed: Apr. 29, 2015

(86) PCT No.: PCT/EP2015/059375
§ 371 (c)(1),
(2) Date: Nov. 29, 2016

(87) PCT Pub. No.: WO2015/180920
PCT Pub. Date: Dec. 3, 2015

(65) Prior Publication Data
US 2017/0197282 A1    Jul. 13, 2017

(30) Foreign Application Priority Data

May 30, 2014  (EP) .................................... 14170574

(51) Int. Cl.
*B23P 6/00* (2006.01)
*F01D 5/00* (2006.01)
(Continued)

(52) U.S. Cl.
CPC .............. *B23P 6/007* (2013.01); *B23K 9/167* (2013.01); *B23K 9/173* (2013.01); *B23K 26/342* (2015.10);
(Continued)

(58) Field of Classification Search
CPC ........................................................ B23P 6/007
See application file for complete search history.

(56) References Cited

U.S. PATENT DOCUMENTS 5,622,638 A * 4/1997 Schell ................ B23K 26/0853
219/121.64
6,332,272 B1   12/2001 Sinnott et al.
(Continued)

FOREIGN PATENT DOCUMENTS

CN     101108453 A     1/2008
CN     102705155 A     10/2012
(Continued)

OTHER PUBLICATIONS

Office Action (First Office Action) dated Jun. 22, 2018, by the Chinese Patent Office in corresponding Chinese Patent Application No. 201580029030.8, and an English Translation of the Office Action. (10 pages).
(Continued)

*Primary Examiner* — Moshe Wilensky
*Assistant Examiner* — Kyle A Cook
(74) *Attorney, Agent, or Firm* — Buchanan Ingersoll & Rooney PC

(57) ABSTRACT

A method is disclosed for repairing a precision casted turbine blade having a squealer and at least one letterbox which was closed by brazing during new-part manufacturing, wherein the letterbox area was damaged during operation in the first life cycle of the blade.

10 Claims, 5 Drawing Sheets

(51) Int. Cl.
*F01D 5/20* (2006.01)
*B23K 9/167* (2006.01)
*B23K 9/173* (2006.01)
*B23K 26/342* (2014.01)
*F01D 5/18* (2006.01)
*B23K 101/00* (2006.01)

(52) U.S. Cl.
CPC .............. *B23P 6/002* (2013.01); *F01D 5/005* (2013.01); *F01D 5/187* (2013.01); *F01D 5/20* (2013.01); *B23K 2101/001* (2018.08); *F05D 2220/30* (2013.01); *F05D 2230/12* (2013.01); *F05D 2230/234* (2013.01); *F05D 2230/235* (2013.01); *F05D 2230/80* (2013.01); *F05D 2240/307* (2013.01)

(56) References Cited

U.S. PATENT DOCUMENTS

| | | | | |
|---|---|---|---|---|
| 6,532,656 | B1* | 3/2003 | Wilkins | B23K 31/02 29/889.1 |
| 8,091,228 | B2* | 1/2012 | Hiskes | B23P 6/005 29/889.1 |
| 8,091,229 | B2 | 1/2012 | Deak et al. | |
| 2005/0190877 | A1* | 9/2005 | Knapp | G21C 13/036 376/203 |
| 2008/0017280 | A1 | 1/2008 | Vargas et al. | |
| 2009/0049689 | A1 | 2/2009 | Hiskes | |
| 2009/0155083 | A1 | 6/2009 | Rose | |
| 2010/0200189 | A1* | 8/2010 | Qi | B22F 3/105 164/492 |
| 2011/0135483 | A1* | 6/2011 | Hunt | B23P 15/04 416/223 R |
| 2011/0209347 | A1 | 9/2011 | Deak et al. | |
| 2013/0298400 | A1 | 11/2013 | Munshi et al. | |
| 2013/0302166 | A1 | 11/2013 | Lee et al. | |
| 2014/0069893 | A1* | 3/2014 | Bruck | B23P 6/007 219/76.14 |

FOREIGN PATENT DOCUMENTS

| | | |
|---|---|---|
| EP | 2 028 342 A2 | 2/2009 |
| EP | 2 071 124 A2 | 6/2009 |
| WO | WO 01/51772 A1 | 7/2001 |
| WO | WO 2013/169747 A1 | 11/2013 |
| WO | WO 2013/169754 A1 | 11/2013 |
| WO | WO 2014/009485 A1 | 1/2014 |

OTHER PUBLICATIONS

International Search Report (PCT/ISA/210) dated Jun. 9, 2015, by the European Patent Office as the International Searching Authority for International Application No. PCT/EP2015/059375.

Written Opinion (PCT/ISA/237) dated Jun. 9, 2015, by the European Patent Office as the International Searching Authority for International Application No. PCT/EP2015/059375.

* cited by examiner

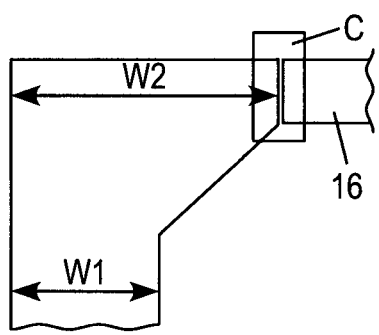 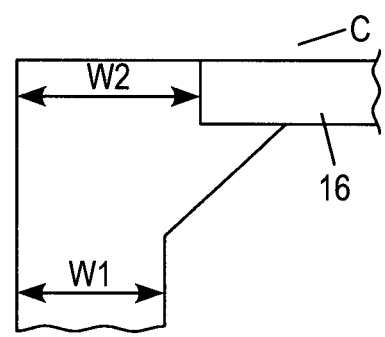
FIG. 5a)    FIG. 5b)
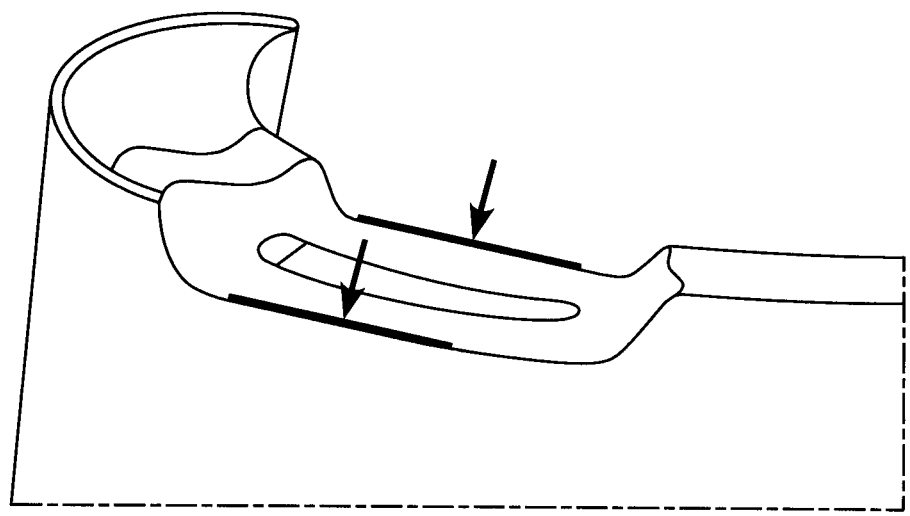
FIG. 6

METHOD FOR REPAIRING TURBINE COMPONENTS

BACKGROUND OF THE INVENTION

The present invention relates to the technology of gas turbines. It refers to a method for repairing turbine components, especially turbine blades, by welding.

PRIOR ART

Typical gas turbine blades, an example of such a blade 10 is illustrated in FIG. 1, comprise an airfoil 11, which extends in radial direction from a shaft 12 and ends with a blade tip 14. Below the shaft 12 is a root section 13 (foot of the blade) for mounting the blade 10 in a respective groove of the rotor (not shown). Part of the blade tip 14 is a crown with a crown plate 14' and a rim (squealer 14"). Those tip features are often referred as squealer tips and are designed to minimize the tip leakage flow, protect the blade tip from the full impact of high temperature leakage gases, when the tip cavity is used as a cooling system and protect the blade against incidental rubs. An additional feature of the blade tip 14 is a so called letterbox 15 (details see below).

Gas turbine components, such as turbine blades, are often made of nickel-based alloys. Precision casting of such alloys is widely used as a primary shaping technology process. Precision casting has some typical technology related limitations, which must be considered already during design of the components manufactured by this process. Some of the design features implemented for manufacturability by precision casting of a component might reduce overall component lifetime, e.g. having these design elements which have a negative influence on oxidation lifetime or lead to reduced high cycle or low cycle fatigue lifetime.

Typical examples are inserts, closure plates or letterboxes, which close the casting related openings in the component, here the turbine blade, in order to ensure the correct internal cooling path. For precision casting these openings are needed for removal of the ceramic cores by chemical leach/etching process. During the new-part manufacturing process chain these openings (letterboxes) are later closed by brazing in closure plates. During service these locations suffer significantly and the parts show often a high degree of distress after de-installation.

For reconditioning and second lifecycle of such components a restoration of the original design is necessary. This includes so far a replacement of the brazed letterbox, but subsequently a high fall-out rate is observed.

To re-braze a new letterbox, a certain amount of healthy base material, this means material which is not being already influenced by previous brazing, is needed due to material and mechanical integrity reasons. This restriction leads to a certain fall-out rate (scrap) during reconditioning. For example, through going cracks above the letterbox are such scrap reasons. Furthermore, a certain wall thickness below the letterbox repair is needed in order to avoid braze erosion, which also leads to fall-out. In addition, a wrong positioning of the electrode during EDM (Electrical Discharge Machining) could also lead to scrap, for example if the letterbox hasn't been eroded out completely, the crown plate is too thin etc.

Instead of the described and well known re-brazing of a turbine tip it is also possible to use a standard weld strategy for closing the component, for example closing a casting hole of a removed letterbox simply by weld filler. But such a method results in a non-optimal inner geometry and leads to weld-related defects, like suck-backs and voids, pores and cracks of the welded repair, which were outside the allowable quality limits for mechanical integrity reasons.

As a state-of-the-art solution for the closing of blade tips usually tip cap welding is performed as described for example in documents EP 2 071 124 A2, WO 2013/169747 A1 or WO 2013/169754 A1 and which illustrated in FIG. 2a, FIG. 2b and FIG. 2c (mainly taken from the prior art document WO 2013/169754 A):

A new closure plate or tip cap 48 is placed above a previously grinded or machined (repair surface 46) blade tip (FIG. 2a) and welded in place (FIG. 2b), e.g. with different weld fillers. The closure of the blade resp. internal cavity 34 is realized by the closure plate/tip cap 48 itself. The finished assembly structure consists according to FIG. 2c of the blade itself with pressure and suction side walls 22, 24, the new tip cap 48 and one or several welded elements, e.g. weld joint 54, peripheral portion 56 and replacement squealer tip 62. This is the typical repair approach for the case, where a blade tip requires a complete or partial opening into its internal cavity 34 (cooling air side).

There are three joined material interfaces (blade, tip cap and weldings) which is a disadvantage because each interface is usually a source of defects. The disadvantage and therefore a limitation of the standard "tip cap" approach consists typically in significant weld defects in the area marked "C" in FIG. 1c and often in an not sufficient bonding between the blade, the weld filler and the tip cap.

It is also known in prior art to keep the repair zone outside of the internal cavity (limited repair).

Welding with a more plastic and forgiving weld filler or increasing the joined length by a special geometry between blade, tip cap and weld filler could bring some improvement. But for cases where additionally the local wall-thickness of blade close to the critical area C is low, this might be not sufficient from mechanical integrity point-of-view.

SUMMARY OF THE INVENTION

It is an object of the present invention to provide an efficient method for repair of a worn component, especially a gas turbine blade, with an improved quality. An optimal inner geometry as well as only defects diminished to an allowable extend should be reached.

According to independent claim 1 the method for repairing a precision casted turbine blade, which comprises an airfoil with a pressure and a suction side with a wall thickness and internal cooling channels, a tip having a tip crown with a crown plate and a squealer and at least one letterbox which was closed by brazing during new-part manufacturing, wherein the letterbox area was damaged during operation in the first life cycle of the blade, comprises the following steps.

a) Removing the damaged letterbox area together with the appropriate tip crown; then
b) Building-up the pressure and suction side of the airfoil by welding to a sufficient height; then
c) CNC machining of the airfoil to the height of a bottom side of the crown plate; then
d) Electrical discharge machining (EDM) of the inner contour of the weld build-up including an exact opening geometry of an internal cavity for incorporation of a closure plate; then
e) Inserting an exactly fitting closure plate into the opening machined in step d) and fixing the closure plate by spot welding; then f) Selecting a weld filler dependent on the required properties and over-welding completely the closure plate such, that the closure plate itself is re-melted and absorbed into the liquid weld pool mainly formed by the selected weld filler, thereby building-up the crown plate; then g) Welding the squealer tip and finally h) Restoring the inner and outer contour of the blade by grinding.

The core of the present application is to place a closure plate into the cavity of the blade opening instead of placing it above the machined level. In the final assembly structure this closure plate does not function as the closing element of the blade, but it is merely a process aid for the subsequent over-welding process.

The closure plate has the function of a weld pool fixation, avoiding that in the critical area "C" the liquid weld pool solidifies with a significant geometrical imperfection (called "suck-backs" or "undercuts"). The closure plate itself is re-melted and absorbed into the liquid weld pool formed mainly by the selected weld filler. After welding, the closure of the blade is realized by the welding itself rather than by any "foreign" tip cap. As an advantage, this allows to limit the number of joined material interfaces from three (blade, tip cap and weldings) to two (blade and weldings incl. dissolved closure plate). Because each interface is usually a source of defects, this is a significant advancement over the standard state-of-the-art process.

In a preferred embodiment removing in step a) comprises machining or grinding out the damaged letterbox area completely, including the braze-influenced zone from new-part manufacturing and the local damage from operation during the first life cycle of the blade. The depth of the cut-out is preferable up to 5 mm below the today's letterbox and an opening angle for the cut-out is in the range of 100-120° with a radius R3.

In one embodiment the building-up in step b) comprises a weld build-up of the pressure side and suction side walls with an increasing wall thickness along the build-up so that the wall thickness at the level of the spot welded closure plate in step e) is higher than at the level of the machined/grinded blade in step a). it is an advantage if the thickening of the wall thickness from the ex-service thickness up to a thickness which equals 2 times the new-make design nominal wall thickness at this area, because then a shift of the critical area "C" towards the middle of the blade, that means away from the load carrying side walls, can be reached. This has the advantage that the size of the closure plate shrinks (limited influence on the weld pool) and the quality of the bonding between the blade and the squealer tip increases by reducing the weld imperfections.

Other preferred embodiments are described in the additional dependent claims, for example when an automated laser welding with an optical scanner for the laser beam is used for adjusting the weald bed thickness and thus the local wall thickness of the weld build-up during the process the repaired component has an extreme high quality and therefore a long second lifetime.

BRIEF DESCRIPTION OF THE DRAWINGS

The present invention is now to be explained more closely by means of different embodiments and with reference to the attached drawings.

FIG. 5a-b show schematically embodiments of the building-up of one of the airfoil sides walls by welding with an increase of the wall thickness after step b) of the present invention;

FIG. 6 shows a photograph of the airfoil after step c) of the present invention;

DETAILED DESCRIPTION OF DIFFERENT EMBODIMENTS OF THE INVENTION

Figure 1:
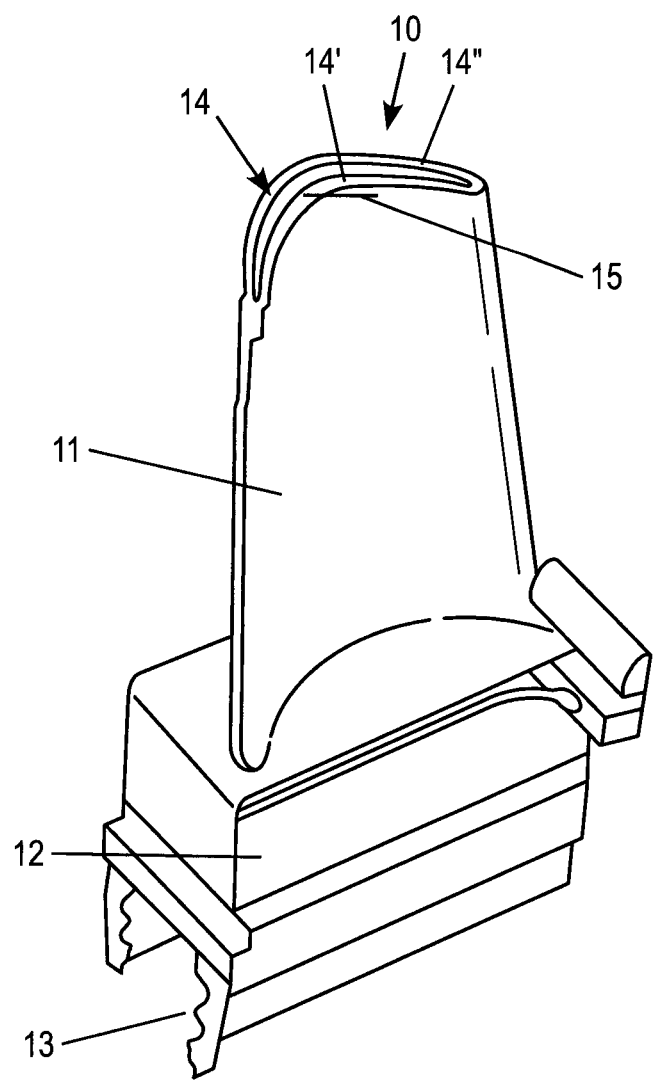
FIG. 1 shows a photograph of a typical gas turbine blade in a perspective view.
Figure 2A:
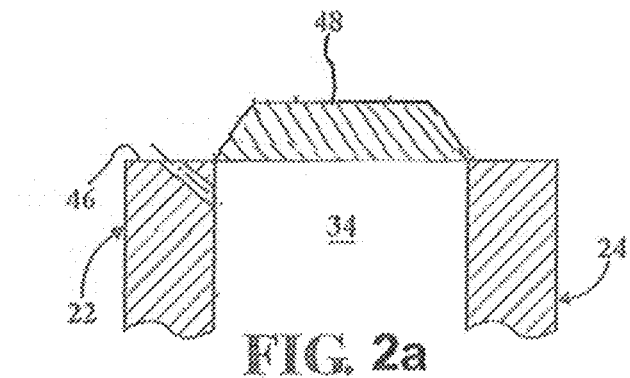
FIG. 2a-c show several steps for closing of the blade tip according to the prior art (tip cap welding)
Figure 2B:
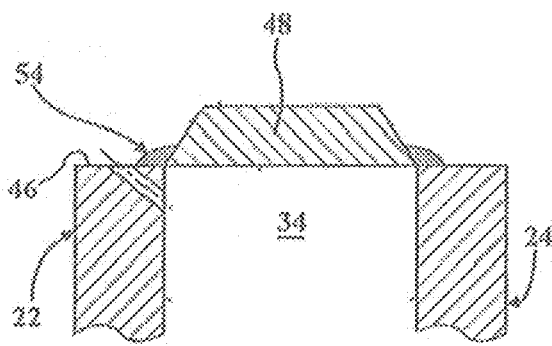
Figure 2C:
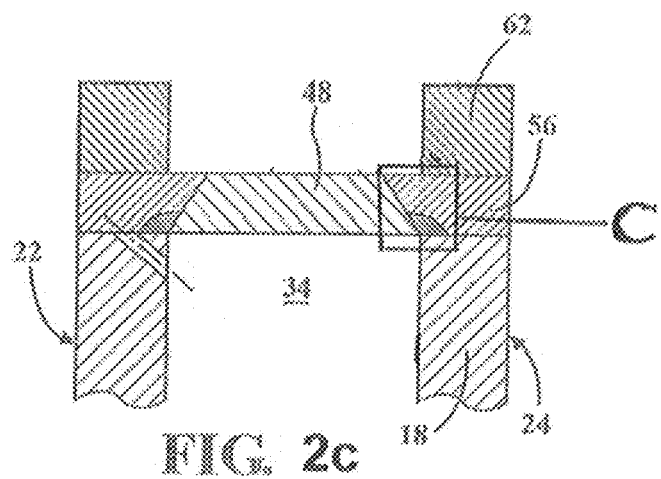

In the following detailed description of a preferred embodiment reference is made to the accompanying drawings that form a part hereof and which is shown by way of illustration, and not by way of limitation. It is to be understood that other embodiments may be utilized and that changes may be made without departing from the scope of the present invention.

As an example, the applicant's GT13E2 Blade 1 (precision casted new blade 10) has two letterboxes 15 (in the tip area 14 with a tip crown), which are closing the casting related core holes. During service these locations suffer significant and the parts show often a high degree of distress after deinstalation.

For reconditioning and a second life cycle of such a component, so far a restoration of the original design, including a replacement of the brazed letterboxes 15, is done, which causes a relative high fall-out rate. According to main idea of the invention the original precision casting driven design feature of the letterbox 15 is not restored during reconditioning, but entirely removed and replaced by a special welded structure.

According to the disclosed method for repairing that precision casted turbine blade 10 comprises the following steps:

a) Removing the damaged letterbox 15 area together with the appropriate tip crown 14'; then b) Building-up the pressure and suction side 22, 24 of the airfoil 11 by welding to a sufficient height; then c) CNC machining of the airfoil 11 to the height of a bottom side of the crown plate 14'; then d) Electrical discharge machining (EDM) of the inner contour of the weld build-up including an exact opening geometry of an internal cavity 34 for incorporation of a closure plate 16; then e) Inserting an exactly fitting closure plate 16 into the opening machined in step d) and fixing the closure plate 16 by spot welding; then f) Selecting a weld filler 54 dependent on the required properties and over-welding completely the closure plate such, that the closure plate 16 itself is re-melted and absorbed into the liquid weld pool mainly formed by the selected weld filler 54, thereby building-up the crown plate 14'; then g) Welding the squealer 14" of the tip 14 and finally h) Restoring the inner and outer contour of the blade 10 by grinding.

Figure 3:
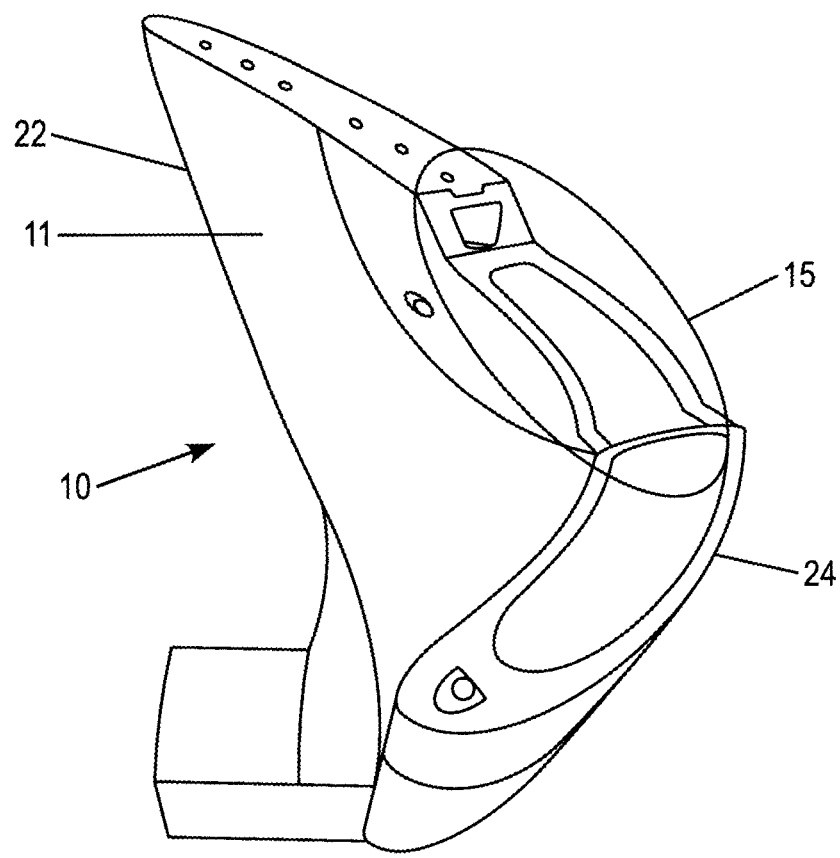
FIG. 3 shows a photograph of an ex-service gas turbine blade with removed letterbox and surrounded material (identified by the circle in the figure) after step a) of the present invention.

By grinding out the damaged letterbox 15 area completely, the local damaged zone from operation of the first life cycle as well as the braze-influenced zone from the new-part manufacturing is removed (see FIG. 3). In a preferred embodiment the depth of the cut-out is up to 5 mm below the originally letterbox 15 and the opening angle for the cut out is 100 to 120° with a radius R3.

Figure 4:
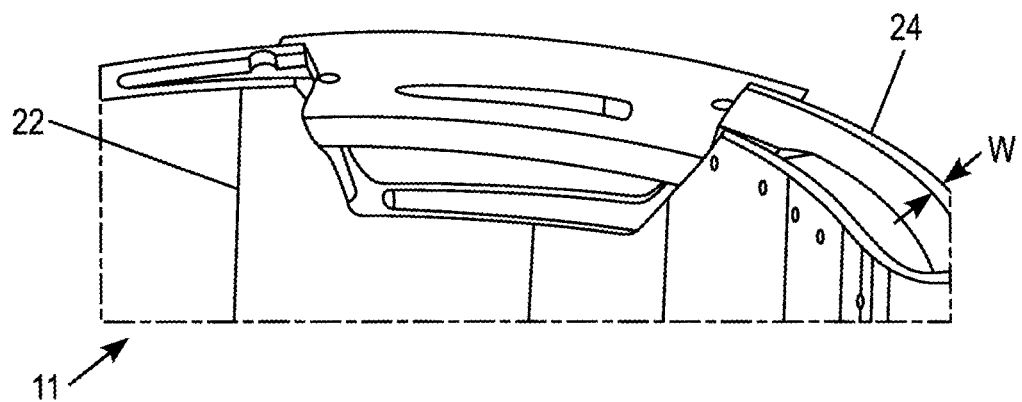
FIG. 4 shows schematically the tip of the blade with a gauge designed for better control of the inner contour of welding.

After that first step, the airfoils 11 at the pressure side 24 and the suction side 22 (as well as the intermediate wall in this embodiment) are weld build-up. In present embodiment the weld-build-up is realized with an increasing wall thickness w along the build-up. A gauge designed for better control of the inner contour of the welding could be used with advantage (see FIG. 4).

The thickening of the local wall below the closure plate level from a value w1, which is the local wall-thickness of the grinded/machined blade to a higher value w2 at the level of the closure plate 16 makes it possible to shift the critical area "C" (see FIG. 5) towards the middle of the blade 10, thus away from the load carrying side walls. On one hand it is now possible to shrink the size of the closure plate 16 (limited influence on the weld pool), and on the other hand the quality of bonding between the blade 10 and the squealer tip 14 above is increased by reducing the weld imperfections. It is preferred when the thickening of the wall thickness from ex-service thickness up to a thickness which equals 2 times the new-make design nominal wall thickness in this area.

After step b), which means after welding the airfoil sides 22, 24 up to a sufficient height the component is CNC machined to the height of the bottom side of the crown plate 14'. The correct height of the CNC-grinding ensures correct local wall thickness w, correct weight distribution and thus correct loading situation for the crown tip 14 (FIG. 6).

Then electrical discharge machining of the inner contour of the weld build-up including the exact opening geometry of an internal cavity 34 for incorporation of a closure plate 16 follows. By doing so, the amount of weld filler 54 (weight=load) and the inner contour of the weld build-up can be controlled for mechanical integrity reasons. The correct inner contour can be assured by the shape of the EDM electrode.

Figure 7A:
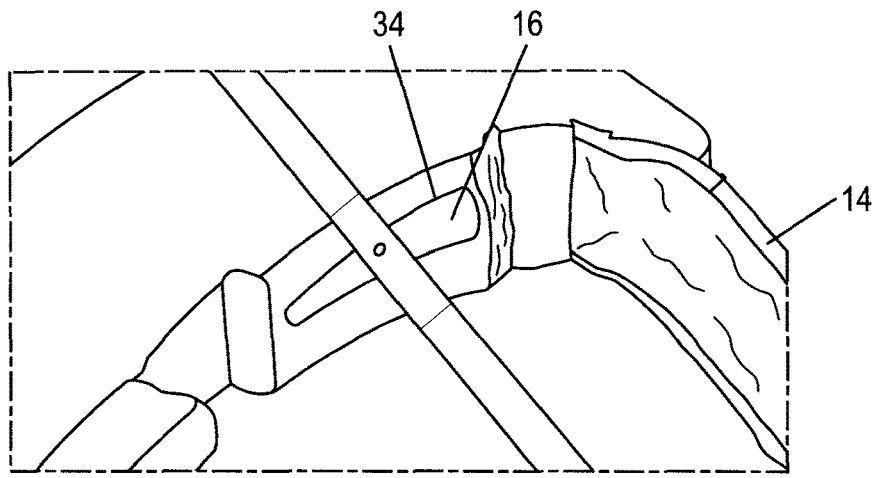
FIG. 7a-c show photographs with several steps for closing the cavity with an inserted exactly fitting closure plate, the spot welded plate and completely over welded plate (after steps e) and f) of the present invention.
Figure 7B:
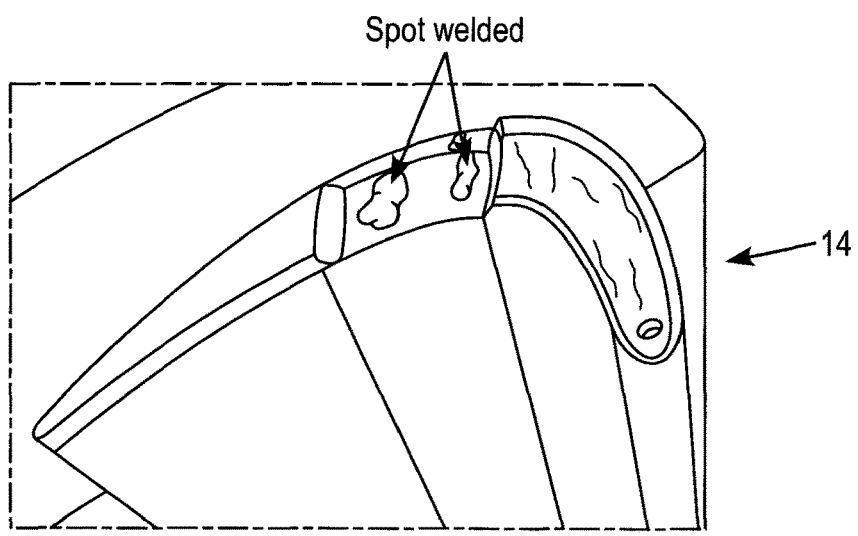
Figure 7C:
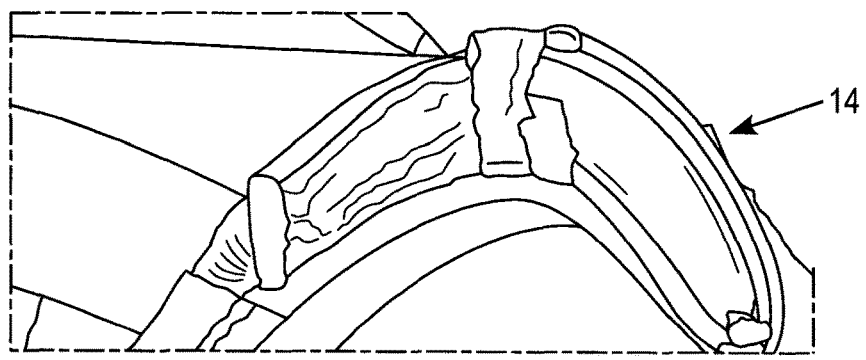

The next step is essential—an exactly fitting closure plate 16 preferrably produced by laser or water-jet cutting is spot welded into the cavity 34 produced by the EDM process (see FIG. 7a and FIG. 7b) and afterwards the entire closure plate 16 is over-welded/(see FIG. 7c). During that close weld process this closure plate 16 serves as a weld pool fixation, securing a stable weld pool and thus a controlled overall weld process including inner geometry of the weld. This has the advantage that typical weld defects such as like geometrical suck-bucks, sharp notches and/or cracks at edges of the inner geometry are minimized.

The material for the closure plate 16 is with advantage Hastelloy X, Haynes 230 or a similar Ni-base superalloy. The thickness of the closure plate 16 is preferable 1.0 to 1.8 mm. The size of the closure plate 16 is optimized for each component.

Relative to the outer airfoil geometry there is a preferred innerwards shift for 2.0 to 4.0 mm. The interface design between the closure plate 16 and the machined part of the blade is in a preferred embodiment "butt fit" (see FIG. 5a) or as an alternative design with a shelf (see FIG. 5a). It is an advantage to use one or combinations of several different weld filler materials optimized for high strength, for high oxidation resistance or for high weldability.

A buffer weld could be realized with different properties compared to the crown plate 14' or the squealer 14" tip weld. This depends on the repaired component and its distress mode.

The weld process is realized by manual or automated TIG (Tungsten Inert Gas) welding, MAG (Metal Active Gas) welding or laser welding (LMF—Laser Metal Forming). Preferred is an automated laser welding including an optical scanner for the laser beam with the possibility of adjusting the weld bead thickness and thus the local wall thickness of the weld build-up during the process.

After over-welding the complete closure plate 16, additionally the squealer tip 14', 14" is being welded according to the known state of the art. Finally the inner (tip cavity) and the outer (airfoil) contour of the blade 10 are restored by grinding, finishing the repair of the component.

The disclosed weld repair is embedded in an overall process chain including restore cooling features, redrilled cooling holes, recoating etc.

Of course, the disclosed process is not limited to the described embodiments. It could be used for all components in which during repair a cavity has to be closed.

LIST OF REFERENCE NUMERALS

10 blade, turbine blade
11 airfoil
12 shaft
13 foot
14 blade tip
14' crown plate
14" squealer
15 letterbox
16 closure plate
18 airfoil outer wall
22 pressure side wall
24 suction side wall
34 internal cavity
46 repair surface
48 closure plate/tip cap
54 weld joint (weld filler)
56 peripheral portion
62 replacement squealer portion
w wall thickness
w1 wall thickness at the level of the machined blade
w2 wall thickness at the level of the welded closure plate

The invention claimed is:

1. A method for repairing a precision casted turbine blade having an airfoil with a pressure side and a suction side with a wall thickness and internal cooling channels, a tip having a tip crown with a crown plate and a squealer and at least one letterbox which was closed by brazing during new-part manufacturing, wherein a letterbox area was damaged during operation in the first life cycle of the blade, said method comprising:
   a) removing the damaged letterbox area together with an appropriate tip crown; then
   b) building-up the pressure and suction side of the airfoil by welding to a sufficient height; then
   c) CNC machining of the airfoil to a height of a bottom side of the crown plate; then
   d) electrical discharge machining (EDM) of an inner contour of the weld build-up including an exact opening geometry of an internal cavity; then e) inserting an exactly fitting closure plate into the opening machined in d) and fixing the closure plate by spot welding; then
f) selecting a weld filler dependent on required properties and over-welding completely the closure plate such that the closure plate itself is re-melted and absorbed into a liquid weld pool mainly formed by the selected weld filler, thereby building-up the crown plate; then
g) welding the squealer of the tip and then
h) restoring the inner and outer contour of the blade by grinding, wherein building-up in b) comprises:
a weld build-up of the pressure side and suction side walls with an increasing wall thickness (w) along the build-up, so that a wall thickness (w2) at a level of the spot welded closure plate in e) is greater than a wall thickness (w1) at a level of the machined/winded blade in a).

2. The method according to claim 1, wherein removing in a) comprises:
machining or grinding out the damaged letterbox area completely, including a braze-influenced zone from new-part manufacturing and a local damage zone from operation during the first life cycle of the blade.

3. The method according to claim 2, wherein the depth of a cut-out in a) is up to 5 mm below the letterbox and an opening angle for the cut-out is in a range of 100 to 120° with a radius R3.

4. The method according to claim 1, wherein the wall thickness (w2) is up to two times of the wall thickness (w1).

5. The method according to claim 1, wherein selecting a weld filler in b) and/or f) comprises:
selecting a weld filler suited for a buffer weld.

6. The method according to claim 1, wherein different materials for the weld fillers in b), f) and/or g) are used dependent on the operational demands of the welds, with one or any combinations of weld filler materials being selected with high oxidation resistance, high strength or high weldability.

7. The method according to claim 1, wherein the material for the closure plate is selected dependent on operational demands.

8. The method according to claim 7, wherein Hastelloy X or Haynes 230 is used as material for the closure plate.

9. The method according to claim 1, wherein TIG welding, MAG welding or laser welding are applied in the process.

10. The method according to claim 9, wherein the laser welding is an automated laser welding with an optical scanner for a laser beam for adjusting weld bed thickness and thus local wall thickness of a weld build-up during processing.

* * * * *